Patented Feb. 27, 1923.

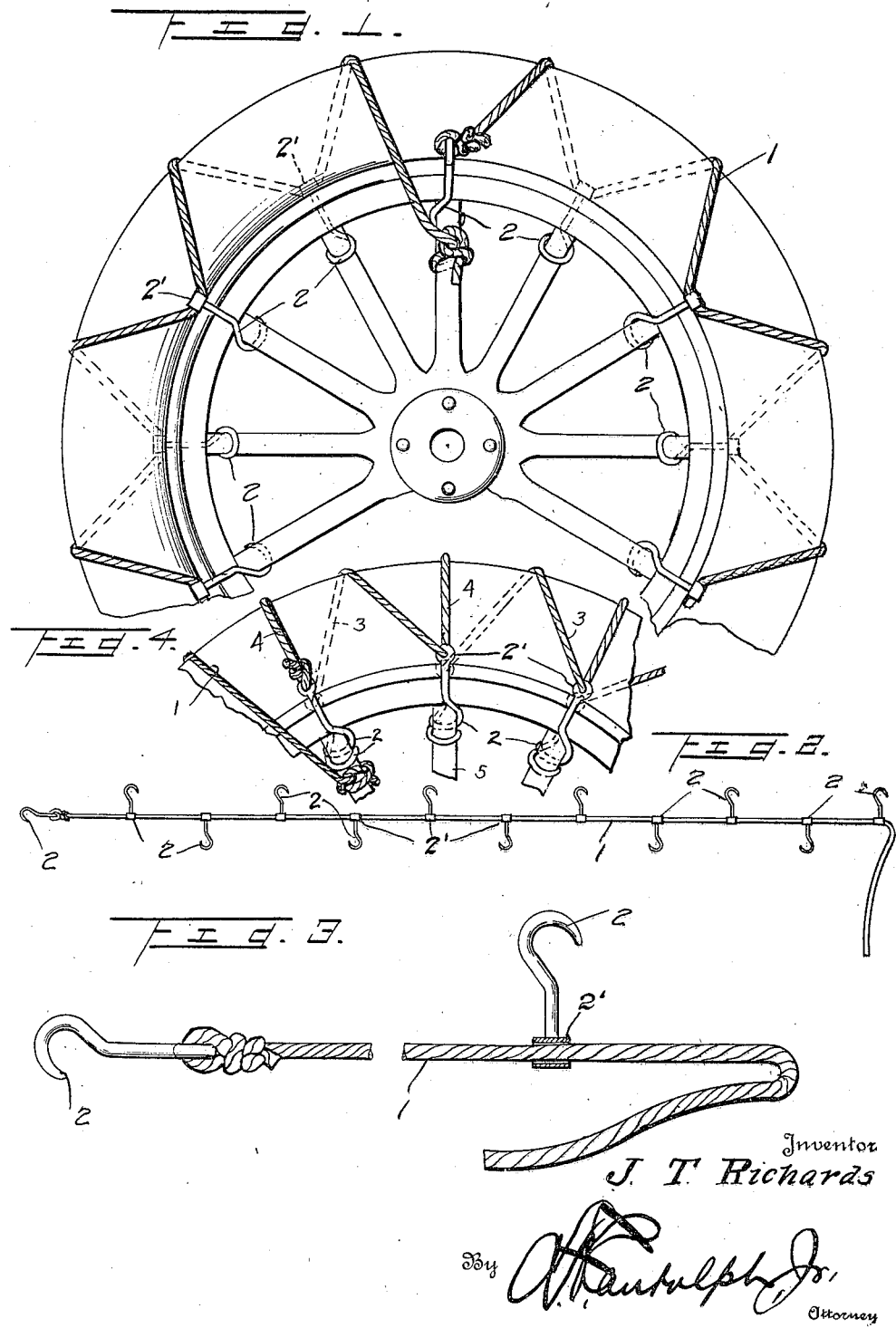

1,447,040

UNITED STATES PATENT OFFICE.

JESSE T. RICHARDS, OF WARRINGTON, FLORIDA.

TRACTION APPLIANCE.

Application filed November 8, 1921. Serial No. 513,633.

*To all whom it may concern:*

Be it known that I, JESSE T. RICHARDS, a citizen of the United States, residing at Warrington, in the county of Escambia and State of Florida, have invented certain new and useful Improvements in a Traction Appliance; and I do hereby declare the following to be a full, clear, and exact description of the invention, such as will enable others skilled in the art to which it appertains to make and use the same.

Mechanically propelled vehicles when encountering sandy places or soft and slippery surfaces usually stall or skid and require the attachment of anti-slipping or skid devices to the rim of the drive wheels to increase their tractive force and offset their tendency to spin and slip.

The present invention provides an anti-slip and skid device which is simple, cheap, light and effective and which may be easily and quickly applied to or removed from the rim of the wheel and which may be conveniently carried as an adjunct and used as a tow line and draft appliance for pulling the machine out of a hole, rut or soft spot.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the spirit or scope of the appended claims.

Referring to the accompanying drawing forming a part of the specification.

Figure 1 is a side view of a portion of a vehicle wheel equipped with traction means embodying the invention, Figure 2 is a diagrammatic view of the parts shown in Figure 1, Figure 3 is a detail view of the appliance with an intermediate portion omitted, and Figure 4 is a detail view of a modification.

Corresponding and like parts are referred to in the following description and designated in the several views of the drawing by like reference characters.

The device consists essentially of a line or rope 1 or like flexible member provided at intervals in its length with attaching elements whereby the line or rope may be secured to the spokes of a wheel. In the preferable construction the attaching elements consist of hooks 2 of such formation as to readily engage the spokes of a wheel and secure the device to the rim thereof. The attaching elements or hooks 2 are mounted on the line or rope 1 and are preferably loose to admit of the device being applied to different sized tires and wheels and the tightening of the rope when in position. This is accomplished by providing each of the hooks with an eye 2' through which the rope passes and through which the rope is slidable. The attaching elements have an alternate or reverse arrangement whereby the hooks face in opposite direction for convenience of engaging the spokes upon opposite sides of the wheel. One of the hooks 2 is secured to an extremity of the line 1 and the opposite terminal hook is disposed some distance from the end of the line whereby provision is had for securing the end of the line by a half hitch or in any other convenient way to make the same fast when applied.

When the device is required for use to prevent slipping or skidding one end of the line or rope 1 is attached to a spoke of the wheel by engaging the terminal hook thereof with a spoke of the wheel. The line is then passed diagonally across the tire and along the opposite side thereof and the next hook 2 in order is engaged with the next spoke upon the opposite side of the wheel, after which the line recrosses the tire diagonally and engages the opposite side thereof and the third hook in order is engaged with the third spoke upon the same side of the wheel as the terminal hook. This operation is repeated, the line being carried forward and backward across the tire and alternately engaged with the spokes upon opposite sides of the wheel. The end portion of the line is made secure by a half hitch or in any manner found most advantageous. By having the hooks 2 loose on the line the latter may be drawn taut and the device may be used in connection with different sized tires and wheels. By having the line crossing the tread of the tire, slipping or skidding is prevented in a manner well understood.

In the modification shown in Figure 4 the line crosses diagonally from one side to the other as indicated at 3, thence recrosses straight, as indicated at 4. The straight crossings 4 are in line with the spokes 5 of the wheel and the diagonal crossings 3 are disposed between the spokes. This arrangement presents double the tractive elements of that shown in Figure 1.

Having thus described the invention, what I claim is:—

1. Traction means for the tire of a vehicle, the same consisting of a rope and attaching elements loose on the rope, the latter crossing the tire diagonally between the spokes and recrossing the tire straight in line with the spokes and secured to the latter upon opposite sides of the wheel.

2. An anti-skidding device for traction wheels comprising a length of rope having free terminal ends, a hook secured to one of said terminal ends, a plurality of hooks disposed along the length of said member and adapted to engage the spokes of a wheel when the member is disposed across the tread surface thereof, and the other of said terminal ends being adapted to be tied about the spoke of a wheel.

In testimony whereof I affix my signature in presence of two witnesses.

JESSE T. RICHARDS.

Witnesses:
J. F. TERRY,
S. M. DAVIS.